United States Patent
Shin et al.

(10) Patent No.: US 7,599,137 B2
(45) Date of Patent: Oct. 6, 2009

(54) OPTICAL PICK-UP ACTUATOR

(75) Inventors: Chang Hoon Shin, Anyang-si (KR); Chang Yeol Song, Osan-si (KR)

(73) Assignee: LG Electronics Inc., Seoul (KR)

( * ) Notice: Subject to any disclaimer, the term of this patent is extended or adjusted under 35 U.S.C. 154(b) by 225 days.

(21) Appl. No.: 11/605,277

(22) Filed: Nov. 29, 2006

(65) Prior Publication Data

US 2007/0121225 A1  May 31, 2007

(30) Foreign Application Priority Data

Nov. 30, 2005  (KR) ...................... 10-2005-0115603
Dec. 23, 2005  (KR) ...................... 10-2005-0128800

(51) Int. Cl.
*G02B 15/14*  (2006.01)
*G02B 7/02*  (2006.01)

(52) U.S. Cl. ...................................... 359/813; 359/703
(58) Field of Classification Search ................. 359/813, 359/814, 824, 703

See application file for complete search history.

(56) References Cited

U.S. PATENT DOCUMENTS

2005/0134974 A1 *  6/2005  Yamada ...................... 359/813

* cited by examiner

*Primary Examiner*—Alicia M Harrington
(74) *Attorney, Agent, or Firm*—Birch, Stewart, Kolasch & Birch, LLP (57) ABSTRACT

An optical pick-up actuator includes a lens holder, a magnetic circuit, a wire spring, a wire holder, and a damper material receptacle. The lens holder includes an objective lens. The magnetic circuit moves the lens holder. The wire spring is coupled at one end thereof to a side of the lens holder, and supports the lens holder. The wire holder fixes the other end of the wire spring. The damper material receptacle defines an insert hole and a through-hole, through which the other end of the wire spring is inserted and passes. The damper material receptacle holds a predetermined damper material that absorbs vibrations imparted on the wire spring. The damper material defines an injecting hole, through which the damper material is injected, separately from the insert hole and the through-hole.

27 Claims, 8 Drawing Sheets

Fig.1

(Related art)

(Related art)

OPTICAL PICK-UP ACTUATOR

BACKGROUND OF THE INVENTION

1. Field of the Invention

The present invention relates to an optical pick-up actuator.

2. Description of the Related Art

In general, an optical pick-up actuator is an apparatus that uniformly maintains the position of an objective lens with respect to an optical recording medium, such as a CD or DVD, by driving a lens holder containing the objective lens in focusing, tracking, and tilting directions, in order to follow the tracks in the optical writing medium.

Figure 1:
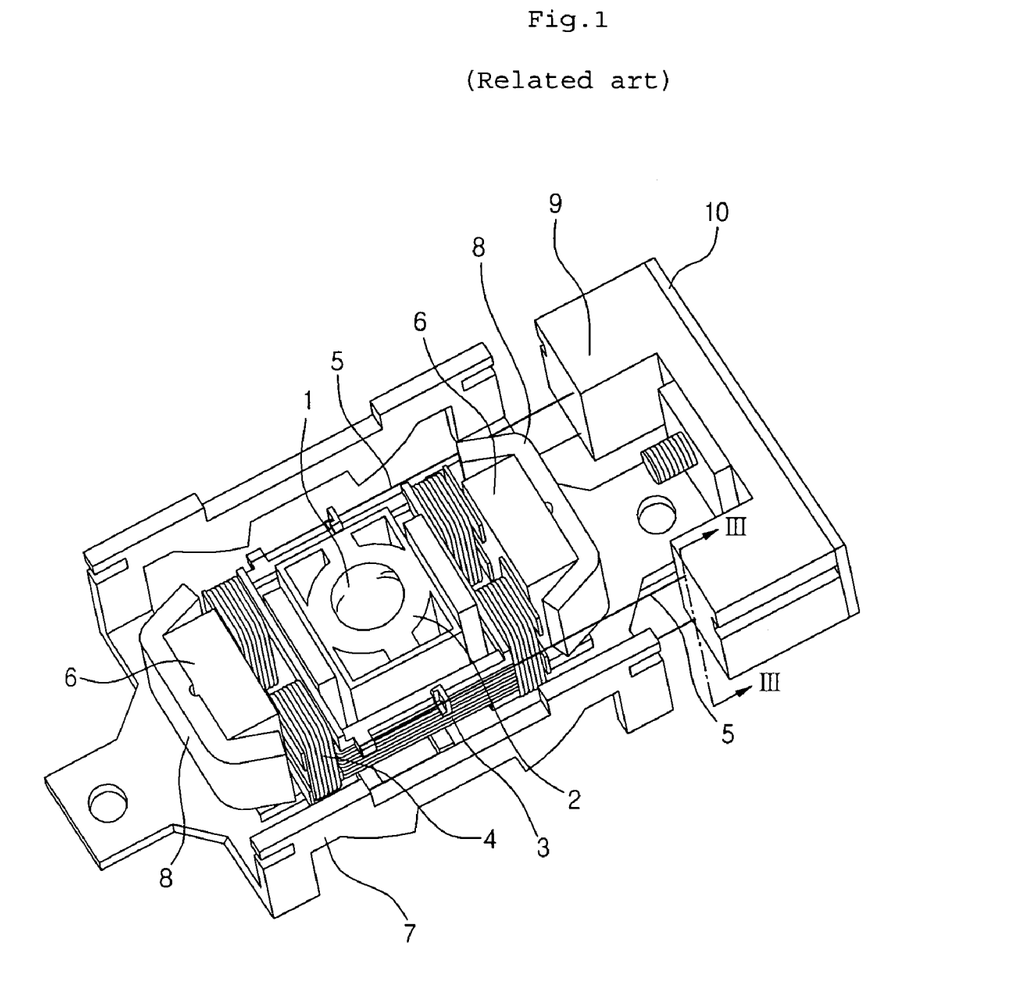
FIG. 1 is a perspective view of an optical pick-up actuator according to the related art.

FIG. 1 is a perspective view of an optical pick-up actuator according to the related art.

Referring to FIG. 1, an optical pick-up actuator according to the related art includes a lens holder 2 having an objective lens 1 installed therein. A focusing coil 3 and a tracking coil 4 are respectively wrapped around the lens holder 2.

Four wire springs 5 are fixed on the lens holder 2. The wire springs 5 electrically connect the focusing and tracking coils 3 and 4.

The lens holder 2 is supported by magnets 6 provided on a base 7 of the actuator. The magnets 6 are fixedly installed on a yoke 8 to face the focusing and tracking coils 3 and 4. The yoke 8 may be integrally formed with the base 7, or separately attached to the base 7.

A wire holder 9 for fixing the opposite ends of the wire springs 5 is formed at one side of the base. A circuit board 10 is installed on the rear surface of the wire holder 9.

Figure 2:
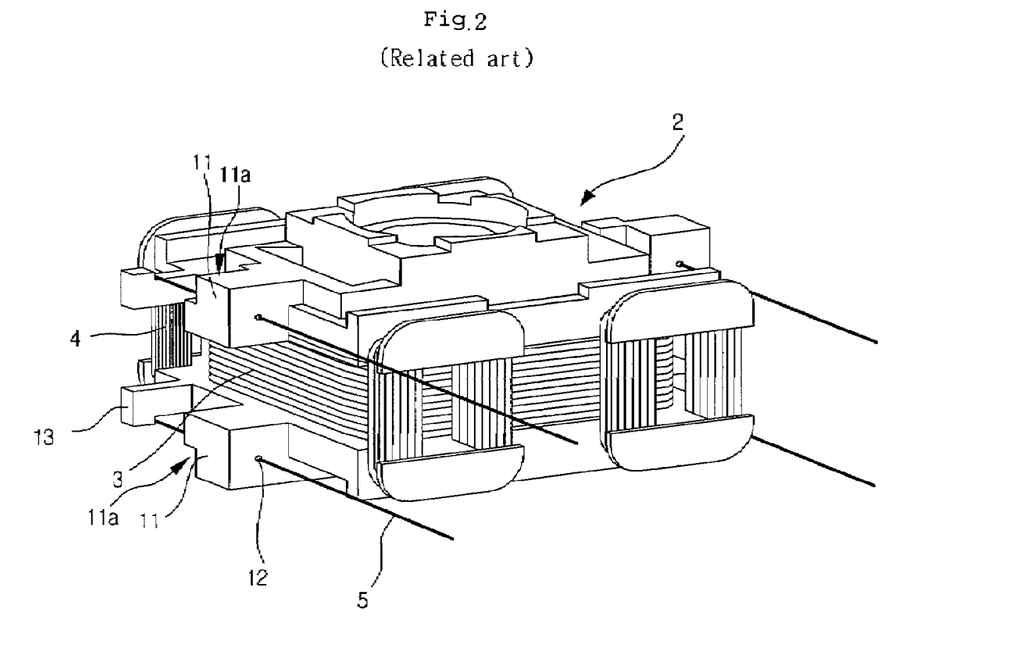
FIG. 2 is a perspective view showing wire springs coupled to a lens holder in an optical pick-up actuator according to the related art.

FIG. 2 is a perspective view showing wire springs coupled to a lens holder in an optical pick-up actuator according to the related art.

Referring to FIG. 2, a fixing protrusion 11 is formed on either side at the top and bottom of the lens holder 2. The fixing protrusion 11 has a through-hole 12 through which the wire spring 5 passes.

A connecting protrusion 13 is formed facing each of the fixing protrusions 11 on either side surface of the lens holder 2. A stepped receiving portion 11a is formed on the outer surface of the fixing protrusion 11. The wire springs 5 electrically connect the focusing coil 3 to the tracking coil 4 at the connecting protrusion 13.

In order to couple the wire springs 5 to the lens holder 2, the wire springs 5 pass through the through-holes 12, and an adhesive epoxy is applied to the receiving portion 11a to adhere the wire springs 5 to the lens holder 2.

However, the receiving portion 11a is only stepped, and there is no structure provided to prevent the applied epoxy from flowing to the adjacent structures. Thus, during the process of applying adhesive, the adhesive may drip from the receiving portion 11a and the fixing protrusion 11, causing a loose attachment between the wire spring 5 and the lens holder 2.

Also, in the process of applying adhesive to the outer surface of the fixing protrusion 11, if the adhesive should drip elsewhere, more adhesive needs to be used in lieu of the dripped adhesive, thereby wasting adhesive.

Additionally, when an excessive amount of adhesive is applied, the weight of the lens holder 2 increases, thereby deteriorating the driving characteristics (such as focusing and tracking) of the lens holder, which focuses light onto a disk.

Figure 3:
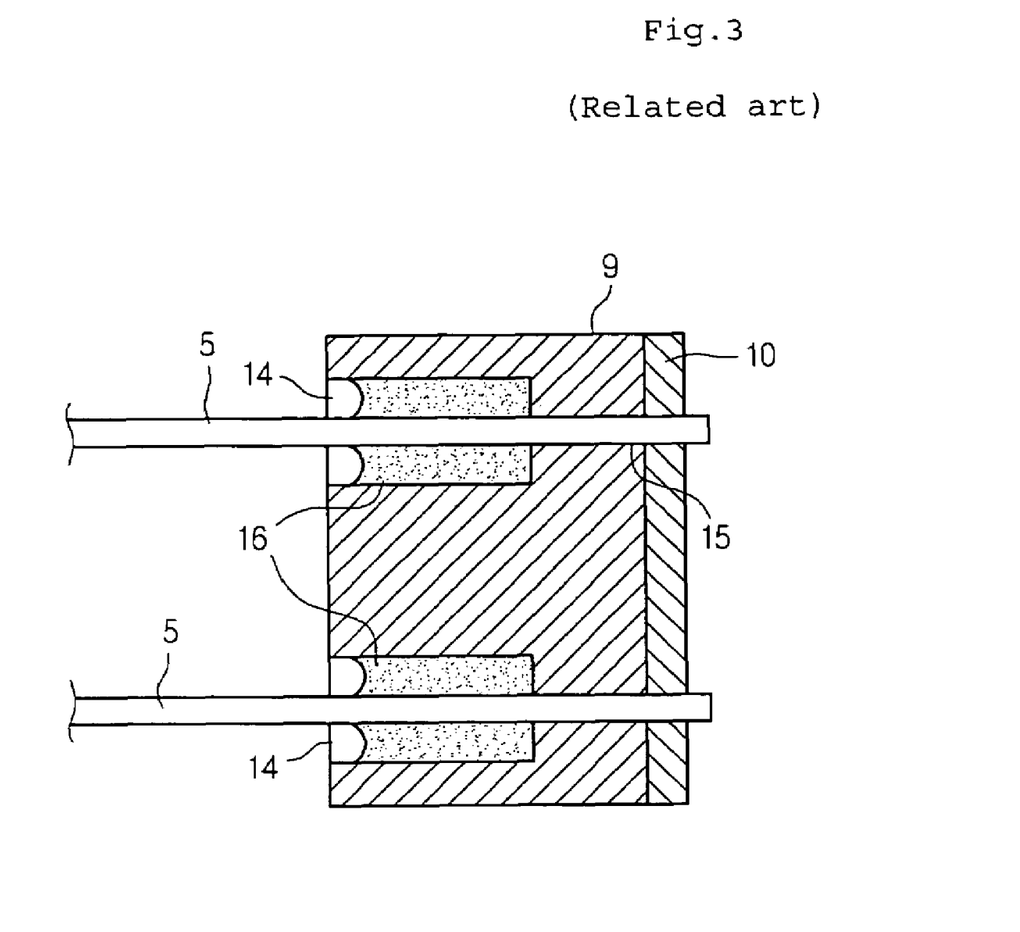
FIG. 3 is a sectional view taken along line III-III of FIG. 1.

FIG. 3 is a sectional view taken along line III-III of FIG. 1.

Referring to FIG. 3, the wire holder 9 is either coupled to the base 7 or integrally formed with the base 7. There are four filling holes 14 formed in the wire holder 9. The filling holes 14 extend a predetermined depth into the wire holder 9 from its front surface. The filling holes 14 may alternately be opened at the front and the sides.

Through-holes 15 having almost the same diameter as the wire springs 5 are formed through the wire holder 9, so that the opposite ends of the wires 5 are inserted through the filling holes 14 and the through-holes 15, reaching the rear surface of the wire holder 9.

A damper material 16 made of an ultraviolet ray hardenable viscoelastic material that has undergone gelation is filled to enclose the wire spring 5 inside the filling hole 14. Here, the liquid damper material 16 that is injected into the filling hole 14 is formed using ultraviolet ray exposure for quick hardening, resulting in a viscoelastic material.

Also, the other ends of the wire springs 5 are soldered to a land of the circuit board 10 at the rear surface of the wire holder 9, to induce the flow of current through the focusing and tracking coils 3 and 4.

During operation, the magnets 6 emit magnetic fluxes transversely to the direction of current flowing through the focusing and tracking coils 3 and 4.

A vertical force is generated from the current flowing through the focusing coil 3, so that the lens holder 2 moves the objective lens 1 in a focusing direction.

Likewise, a horizontal force is generated from the current flowing through the tracking coil 4, so that the lens holder 2 moves the objective lens 1 in a tracking direction.

Here, due to the movement of the driving portion formed of the objective lens 1 and the lens holder 2, the wire springs impart elasticity on the lens holder 2, so that the driving portion generates fine vibrations.

The vibration distortions thus generated are absorbed by the viscoelastic material 16, so that the vibrations from the driving portion are reduced or eliminated.

However, the assembly process of radiating ultraviolet rays onto the damper material 16 to obtain a predetermined viscoelasticity thereof, following the filling of the liquid damper material 16 in the filling hole 14, requires much equipment and manpower. In addition, the assembly process suffers from the problems of having to quickly inject the filling hole 14 with damper material 16, and non-uniformity in performance of the damper material 16.

For example, because damper material 16 for filling into four separate filling holes 14 in the wire holder 9 is contained in a single syringe (which must fill the holes one by one), the quantity of damper material 16 filling each of the filling holes 14 may be excessive or insufficient, and bubbles may be formed inside the filling holes 14, so that the hardness may vary, causing the damping characteristics of the damper material 16 in each hole to be non-uniform.

SUMMARY OF THE INVENTION

Accordingly, the present invention is directed to an optical pick-up actuator that substantially obviates one or more problems due to limitations and disadvantages of the related art.

An object of the present invention is to provide an optical pick-up actuator with a lens holder and wire springs that are solidly coupled, by applying a uniform amount of adhesive for coupling each of the wire springs to the lens holder.

Another object of the present invention is to provide an optical pick-up actuator with damper material that has uniform performance characteristics for reducing or eliminating vibration distortion in the wire springs, and that can quickly be injected into a wire holder.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an optical pick-up actuator including: a lens holder including an objective lens; a magnetic circuit for moving the lens holder; a wire spring coupled at one end thereof to a side of the lens holder, the wire spring for supporting the lens holder; a wire holder fixing the other end of the wire spring; and a damper material receptacle defining an insert hole and a through-hole through which the other end of the wire spring is inserted and passes, the damper material receptacle for holding a predetermined damper material that absorbs vibrations imparted on the wire spring, wherein the damper material defines an injecting hole, through which the damper material is injected, separately from the insert hole and the through-hole.

In another aspect of the present invention, there is provided an optical pick-up actuator including: a lens holder including an objective lens, a focusing coil and a tracking coil that are respectively wound with wire, and a fixing protrusion; magnets installed to respectively face the focusing coil and the tracking coil; a wire spring coupled at one end thereof to the fixing protrusion, the wire spring for connecting the focusing coil and the tracking coil; a wire holder including a damper material receptacle through which the other end of the wire spring passes, the damper material receptacle for holding a predetermined damper material for enclosing a predetermined portion of the wire spring that is passed therethrough; and a circuit board formed on a rear surface of the wire holder, for connecting to the other end of the wire spring that passes through the damper material receptacle, wherein an injecting hole for injecting damper material is formed in a top surface of the damper material receptacle.

In a further embodiment of the present invention, there is provided an optical pick-up actuator including: a base; a wire holder provided at a side of the base; a lens holder installed at an upper portion of the base, including an objective lens, and having a fixing protrusion forming an adhesive chamber provided on either end thereof; a magnetic circuit for allowing the lens holder to move; a wire spring with one end thereof passing through the adhesive chamber of the fixing protrusion and coupled to the lens holder with an adhesive, and the other end thereof fixed to the wire holder; and a damper material receptacle through which the other end of the wire spring passes, for holding a predetermined damper material that absorbs vibrations generated by the movement of the lens holder.

The above-structured optical pick-up actuator allows adhesive for coupling a lens holder to wire springs to be injected accurately into predetermined locations without dripping elsewhere, so that a firmer coupling of the lens holder and the wire springs can be realized, and a fixed amount of adhesive is used, preventing waste of adhesive.

Also, the damper material that eliminates vibration distortion on the wire springs can be injected quickly and evenly into the filling portions of the wire holder, so that the damping effectiveness of the driving portion has a uniform range of movement, and the assembly process of the optical pick-up actuator becomes simpler.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 4:
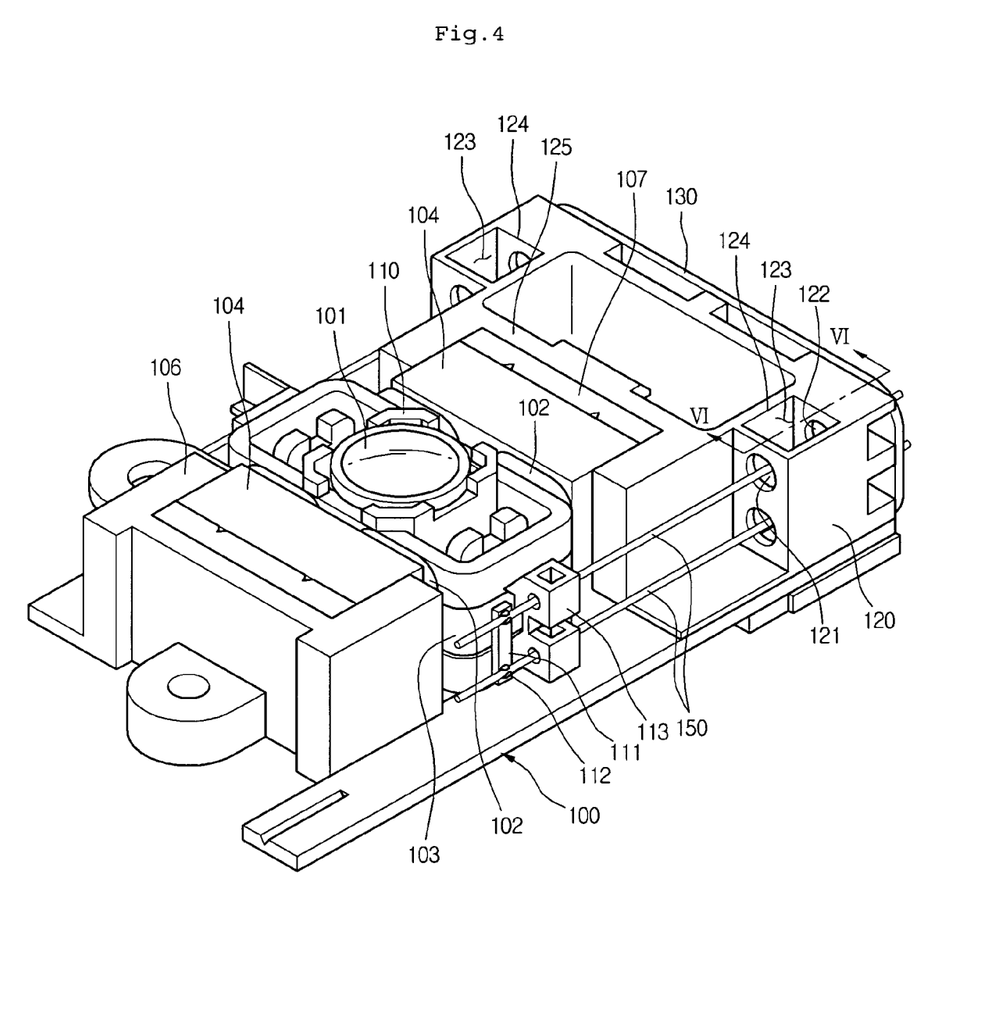
FIG. 4 is a perspective view of an optical pick-up actuator according to an embodiment of the present invention.

FIG. 4 is a perspective view of an optical pick-up actuator according to an embodiment of the present invention.

Referring to FIG. 4, an optical pick-up actuator according to the present invention includes a base 100, a driving portion installed to be supported by the base 100, and a magnetic circuit for prompting the driving portion to be driven in focusing and tracking directions.

The driving portion is formed of a lens holder 110 with an objective lens 101. The magnetic circuit includes wire-wound focusing and tracking coils 102 and 103 to one side of the lens holder 110, and magnets 104 installed oppositely to the focusing and tracking coils 102 and 103.

When a current is applied to the focusing coil 102 or the tracking coil 103, a Lorentz force is generated between the magnet 104 and the focusing or tracking coil 102 or 103, so that the driving portion moves in a focusing direction or a tracking direction.

The optical pick-up actuator includes a wire spring 150 (of which an end is coupled to one side of the lens holder 110), a wire holder 120 (to which the other end of the wire spring 150 is fixed), and a circuit board 130 formed on the rear surface of the wire holder 120.

The wire spring 150 is made of a rigid metal material that conducts electricity, with one end thereof coupled to a fixing protrusion 113 formed on one side of the lens holder 110 and the other end thereof connected to the circuit board 130.

A substrate 111 is respectively installed on either side surface of the lens holder 110, and the wire spring 150 is soldered to the substrate 111, thereby electrically connecting the focusing coil 102 and the tracking coil 103.

The wire spring 150 conducts a current from the circuit board 130 to the focusing and tracking coils 102 and 103, thereby enabling the driving portion to move in focusing and tracking directions.

Although the wire spring 150 according to embodiments of the present invention is installed in quadruplicate (with two on each side of the lens holder 110 connecting the focusing coils 102 and the tracking coils 103), the wire spring 150 may be singular or provided in triplicate on either side of the lens holder 110.

A tilting coil for driving the lens holder 110 in a tilting direction may also be provided, in which case the number of wire springs 150 may be altered.

Specifically, the present invention is not limited in its number of installed wire springs 150, which function to conduct current respectively to the focusing and tracking coils 102 and 103 when the current is applied to the wire springs 150.

Also, an insert hole 121 and a through-hole 122 are formed in the wire holder 120, through which the wire springs 150 pass and are connected to the circuit board 130. The insert hole 121 and the through-hole 122 may be formed in different ways, depending on the number of wire springs 150 installed. That is, a plurality of wire springs 150 may be made to pass through one insert hole 121 and one through-hole 122.

The opposite end of the wire spring 150 passes through a damper material receptacle 124 between the insert hole 121 and the through-hole 122. The damper material receptacle 124 defines an injecting hole 123 thereabove for injecting a predetermined damper material 140. The damper material receptacle 124 may be formed as a single hole that has a plurality of wires disposed within the damper material receptacle.

After the opposite end of the wire spring 150 passes through the insert hole 121 and the damper material receptacle 124, it is passed through the through-hole 122 and is connected to the circuit board 130.

The damper material 140 may be an ultraviolet hardened viscoelastic material, which is injected through the injecting hole 123 into the damper material receptacle 124 in liquid form, and then hardened through ultraviolet ray emission.

Because the injecting hole 123 of the damper material receptacle 124 is formed in an upward direction, the damper material 140 may be quickly and uniformly filled into the damper material receptacle 124.

The damper material receptacle 124 may be formed of a material that transmits ultraviolet radiation. In this case, after the filling of the liquid damper material 140 into the damper material receptacle 124, when ultraviolet rays are emitted, they will be transmitted through the walls of the damper material receptacle 124 to the damper material 140, to more easily harden the damper material 140.

Because the wire spring 150 is enclosed by damper material 140 in the damper material receptacle 124 (which the wire spring 150 is passed through), the damper material 140 can absorb vibration distortions incurred on the wire spring 150.

That is, when the wire spring supports the driving portion, and the driving portion moves in a focusing or tracking direction, imparting vibration distortions on the wire spring 150, these vibration distortions can be absorbed and cancelled by the damper material 140.

Because the wire spring 150 is enclosed by the hardened damper material 140 in the damper material receptacle 124 that it has passed through, the wire spring 150 may be firmly fixed to the wire holder 120.

Figure 5:
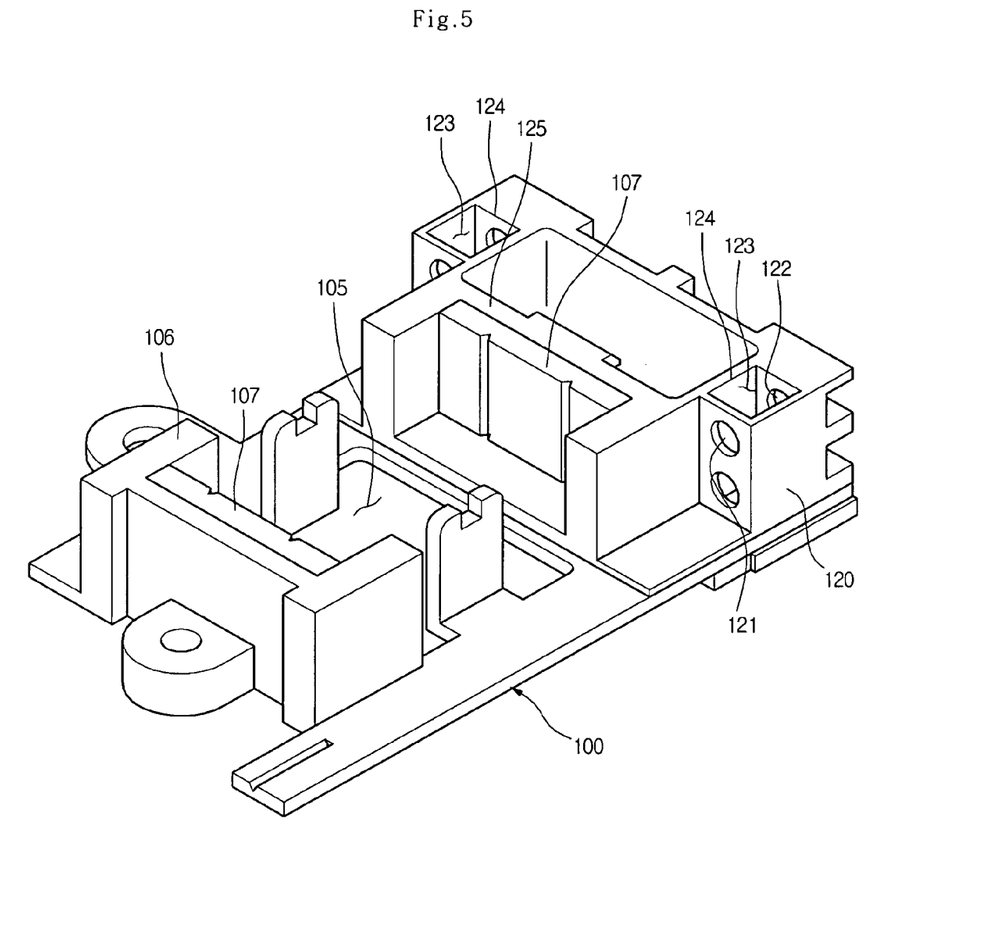
FIG. 5 is a perspective view of a wire holder of an optical pick-up actuator according to an embodiment of the present invention.

FIG. 5 is a perspective view of a wire holder of an optical pick-up actuator according to an embodiment of the present invention.

A detailed description of the wire holder 120 and the damper material receptacle 124 will be given, with reference to FIG. 5.

Referring to FIG. 5, the wire holder 120 is provided on one side of the base 100. Here, the wire holder 120 may be integrally formed with the base 100, or may be separately formed and fixed to one side of the base 100.

The base 100 forms a mounting receptacle 105 for receiving the driving portion in a suspended state, and a first supporting portion 106 for installing one of a pair of magnets 104.

The wire holder 120 forms a second supporting portion 125 for supporting the other of the pair of magnets 104. A damper material receptacle 124 is formed on either side of the second supporting portion 125.

While the damper material receptacle 124 is formed integrally with the wire holder 120 in the present embodiment, in other embodiments, the damper material receptacle 124 may be formed separately and then installed at either side of the wire holder 120.

A yoke 107 is installed between the first and second supporting portions 106 and 125 and the magnets 104, for inducing a magnetic flux generated by the magnets 104.

The damper material receptacle 124 is formed in a region through which the opposite end of the wire spring 150 passes and is connected to the circuit board 130, and includes an injecting hole 123 formed in an upward direction to create a filling hole for damper material 140 to pass therethrough.

An insert hole 121, for inserting the wire spring 150 through, is formed at the front surface of the damper material receptacle 124. A through-hole 122 (for the wire spring 150 to pass through and be connected to the circuit board 130) is formed in-line with the insert hole 121 on the rear surface of the damper material receptacle 124.

When a liquid damper material 140 is injected through the injecting hole 123 into the damper material receptacle 124, the damper material 140 can be quickly and uniformly injected because it is filled from the bottom of the damper material receptacle 124 to the top thereof.

The damper material 140 may be evenly filled in the insert hole 121 and the through-hole 122, which are respectively disposed at predetermined heights.

When the liquid damper material 140 is filled in the insert hole 121 and through-hole 122 at the front and rear surfaces of the damper material receptacle 124, the damper material 140 does not flow out from the insert hole 121 and the through-hole 122 due to the surface tension of the liquid, and maintains equilibrium in a filled state.

When ultraviolet rays are emitted onto the damper material receptacle 124 with the liquid damper material 140 filled therein, the emitted ultraviolet rays pass through the walls of the damper material receptacle 124 to the damper material 140, so that the damper material 140 can be easily hardened.

Figure 6:
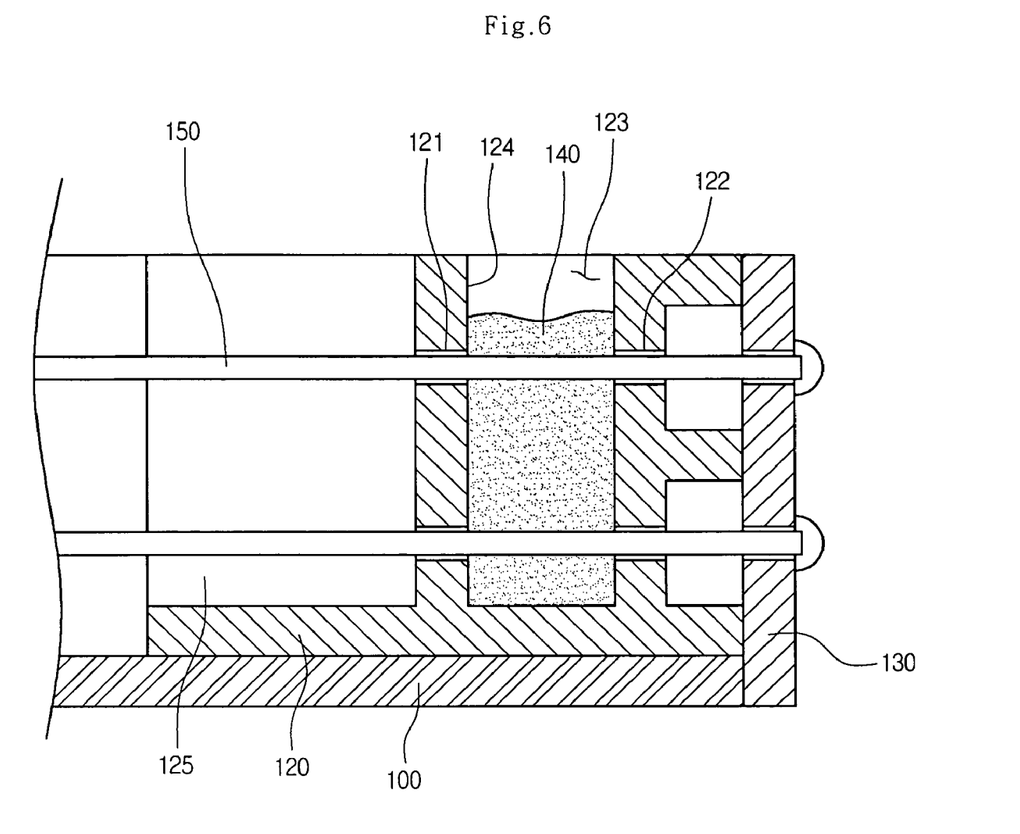
FIG. 6 is a sectional view taken along line VI-VI of FIG. 4.

FIG. 6 is a sectional view taken along line VI-VI of FIG. 4.

FIG. 6 will be referred to in the description of the operation of the optical pick-up actuator according to the present invention.

The circuit board 130 provided on the rear surface of the wire holder 120 supplies a current to the wire spring 150, and as a result, the driving portion moves in a focusing or tracking direction.

That is, when a current is supplied from the circuit board 130 through the wire spring 150 to the focusing coil 102, the driving portion moves in a focusing direction by means of a Lorentz force generated between the focusing coil 102 and the pair of magnets 104.

Also, when a current is supplied from the circuit board 130 through the wire spring 150 to the tracking coil 103, the driving portion moves in a tracking direction by means of a Lorentz force generated between the tracking coil 103 and the pair of magnets 104.

Because the above-described moving of the driving portion in focusing and tracking directions occurs up to several hundred times within a very short duration, torsion and other vibration-induced distortions are incurred on the wire spring 150 that supports the driving portion.

The vibration distortion on the wire spring 150 is transferred along the wire spring 150 to the wire holder 120.

Thus, the vibration distortion that is transferred to the wire holder 120 is absorbed by the damper material 140 that has been injected into the damper material receptacle 124 and hardened, and which encloses a portion of the wire spring 150.

Accordingly, the vibration distortion that is generated by the focusing and tracking movement of the driving portion and transferred to the wire spring 150 is absorbed by the damper material 140, so that the movement of the driving portion in a focusing direction and a tracking direction is not affected by the vibration distortion. Thus, the driving portion can operate normally.

In an optical pick-up actuator according to the present invention, the movement of the driving portion in a focusing direction and a tracking direction is not affected by vibration-induced torsion or distortion, and performs in a normal manner.

Also, the process of filling the damper material 140 in the optical pick-up actuator according to the present invention can be quickly executed due to the injecting hole 123 being formed from the top down. Thus, the damper material receptacle 124, the insert hole 121, and the through-hole 122 can quickly be filled.

Additionally, the process of filling the damper material 140 in the optical pick-up actuator according to the present invention can evenly fill the damper material receptacle 124, the insert hole 121, and the through-hole 122, so that an even damping of the driving portion can be obtained.

Figure 7:
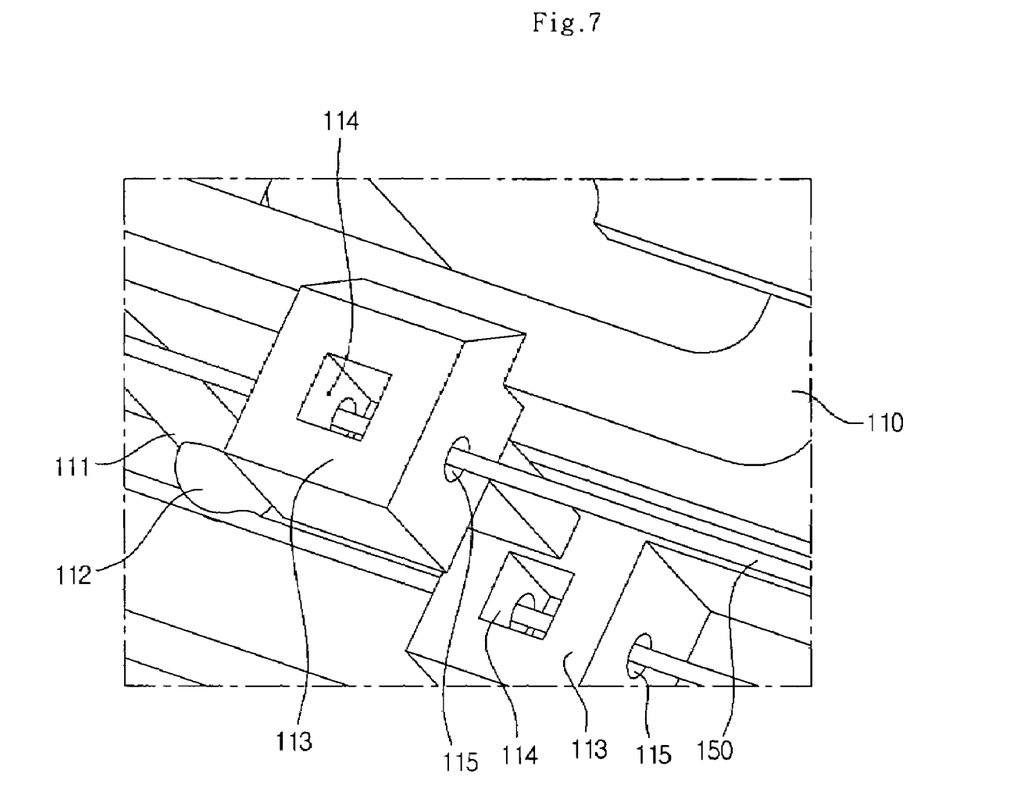
FIG. 7 is a perspective view of an enlarged section of an optical pick-up actuator according to an embodiment of the present invention, showing the coupling of wire springs to the lens holder.

FIG. 7 is a perspective view of an enlarged section of an optical pick-up actuator according to an embodiment of the present invention showing the coupling of wire springs to the lens holder without having any adhesive applied thereto.

Referring to FIG. 7, a substrate 111 is respectively installed on the upper end at either side of the lens holder 110. The substrates 111 are fixed to the tops of the wire springs 150 with solder 112 that electrically connects and fixes the wire springs 150 to the substrates 111.

Two fixing protrusions 113 are provided on each end of the lens holder 110. The fixing protrusions 113 fix the wire springs 150 to the lens holder 110.

Furthermore, the fixing protrusion 113 forms an adhesive chamber 114 that is opened at the top. The adhesive chamber 114 is a portion in which an adhesive for fixing ends of the wire spring 150 to the lens holder 110 is applied, and is formed through the fixing protrusion 113.

A wire through-hole 115, through which one end of the wire spring 150 passes, extends through the fixing protrusion 113. The wire through-hole 115 passes through the fixing protrusion 113 so that it communicates with the adhesive chamber 114.

In further detail, the wire through-hole 115 is formed with a diameter through which one end of the wire spring 150 may pass—that is, the diameter of the wire through-hole 115 is the same as or slightly larger than the diameter of the wire spring 150.

Of course, the design must be made so that adhesive filled in the adhesive chamber 114 does not flow out from the gaps between the wire through-holes 115 and the wire springs 150. To properly design the size of the gaps, the viscosity of the adhesive must be taken into account.

Excluding the upper surface and the surface in which the wire through-hole 115 is formed, the remaining surfaces of the fixing protrusion may be sealed.

A detailed description of the coupling of the lens holder 110 and the wire spring 150 in the optical pick-up actuator according to embodiments of the present invention will be provided below.

First, one end of the wire spring 150 is passed through the wire through-hole 115 of the fixing protrusion 113, to pass through the fixing protrusion 113 itself. Then, the one end of the wire spring 150 that has passed through the fixing protrusion 113 is soldered to the substrate 111 and electrically connected thereto.

The end of the wire spring 150 that has passed through the fixing protrusion 113 also passes through the adhesive chamber 114 inside the fixing protrusion 113. This is explicitly shown in FIG. 7. In this state, adhesive is applied within the adhesive chamber 114.

When adhesive is applied within the adhesive chamber 114, it fills the adhesive chamber 114. The wire through-hole 115 communicating with the adhesive chamber 114 is designed to prevent adhesive from leaking through the gap between it and the wire spring 150, and a predetermined amount of adhesive may fill the adhesive chamber 114.

If adhesive is filled to a predetermined level in the adhesive chamber 114, for example, to the edge of the entrance of the adhesive chamber 114, a predetermined quantity of adhesive can be uniformly used for each adhesive chamber 114.

When adhesive is applied within the adhesive chamber 114 and hardened, the one end of the wire spring 150 that passes through the wire through-hole 115 and the adhesive chamber 114 is coupled to the fixing protrusion 113, or the lens holder 110 through the adhesive.

When the lens holder 110 is coupled to one end of the wire spring 150, the lens holder 110 is supported indirectly by the wire holder 120 through the wire springs 150, and the lens holder 110 is elevated from the top of the base 100.

In the optical pick-up actuator according to the present invention, when adhesive is applied to couple the one end of the wire spring 150 to one side of the lens holder 110, the adhesive may be applied into the adhesive chamber 114 opened at the top of the fixing protrusion 113.

Because the fixing protrusion 113 is sealed on all sides with the exception of the side with the wire through-hole 115 formed and the open side of the adhesive chamber 114, the adhesive that is applied to the adhesive chamber 114 does not leak out, so that the end of the wire spring 150 is more firmly fixed to the fixing protrusion 113.

Also, by applying adhesive to the adhesive chamber 114 in order to couple the one end of the wire spring 150 to the lens holder 110, a uniform amount of adhesive is used in each adhesive chamber 114, preventing waste of adhesive.

Figure 8:
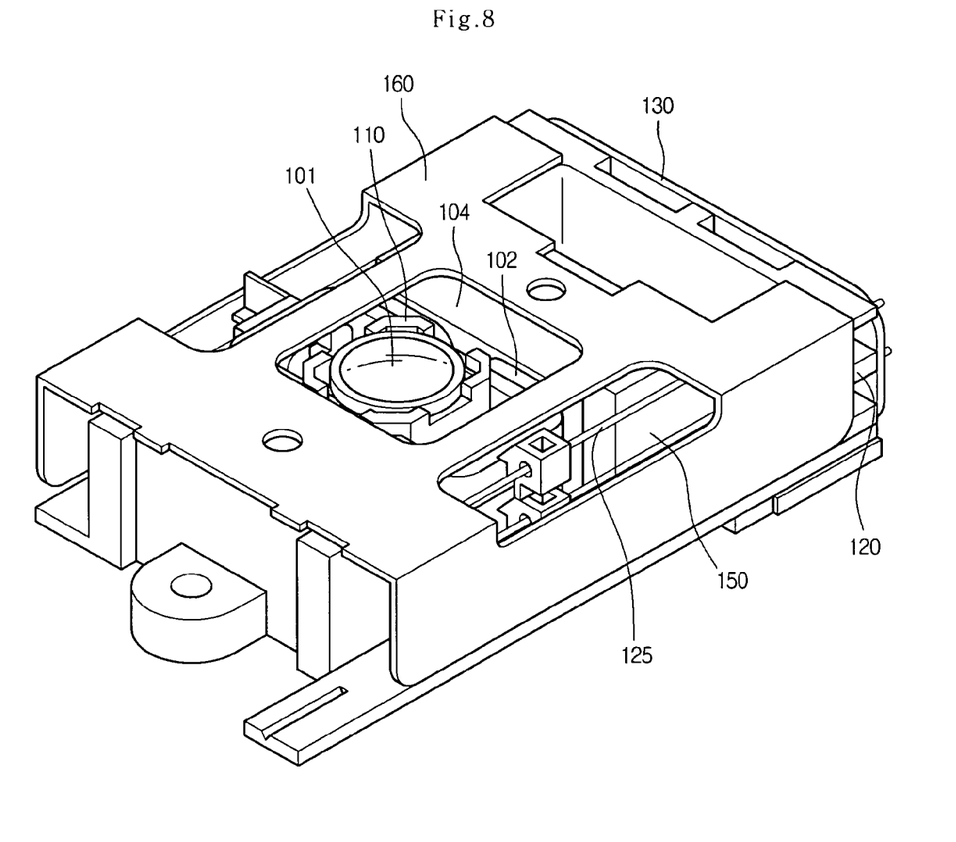
FIG. 8 is a perspective view of an optical pick-up actuator according to a variation of the embodiment of the present invention.

FIG. 8 is a perspective view of an optical pick-up actuator according to a modification of an embodiment of the present invention.

Compared to the above embodiments, there is only one change, that being the addition of a cover, so that the descriptions of the other elements in previous embodiments may be revisited by referring to the same reference numbers of the corresponding elements.

Referring to FIG. 8, in the optical pick-up actuator according to the present embodiment, after liquid damper material is applied to the damper material receptacle 124, a cover 160 for sealing the injecting hole 123 is added.

The cover 160 has the shape of a plate for covering the injecting hole 123, the driving portion, and a portion of the base 100, and may be snap fitted or fixed to the supporting portions 106 and 125 and the wire holder 120 using bolts or other fastening members.

Accordingly, before the liquid damper material that is injected into the damper material receptacle 124 is hardened by ultraviolet ray emissions, it is prevented from leaking to the outside of the damper material receptacle 124. Also, the entry of foreign substances into the damper material receptacle 124 can be prevented.

The cover 160 may have an adhesive applied to a portion thereof that contacts the injecting hole 123 in order to completely seal the injecting hole 123. In this case, the liquid damper material that is injected into the damper material receptacle 124 is completely sealed and prevented from leaking to the outside.

Thus, the liquid damper material is injected into the damper material receptacle 124, and the cover 160 having adhesive applied to portions thereof that contact the injecting hole 123, completely seals the injecting hole 123 when it is installed. Afterward, ultraviolet rays for hardening the liquid damper material are emitted.

The ultraviolet rays are transmitted through the wire holder 120 to harden not only the liquid damper material injected into the damper material receptacle 124, but also the adhesive applied to regions of the cover 160 contacting the injecting holes 123.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An optical pick-up actuator comprising:
a lens holder including an objective lens;
a magnetic circuit for moving the lens holder;
a wire spring coupled at one end thereof to a side of the lens holder, the wire spring supporting the lens holder;
a wire holder fixing the other end of the wire spring; and
a damper material receptacle including an insert hole and a through-hole through which the other end of the wire spring is inserted and passes, the damper material receptacle for holding a predetermined damper material that absorbs vibrations imparted on the wire spring,
wherein the damper material receptacle further includes an injecting hole through which the damper material is injected, the injecting hole being separate from the insert hole and the through-hole.

2. The optical pick-up actuator according to claim 1, wherein the injecting hole is opened upwardly.

3. The optical pick-up actuator according to claim 1, wherein the damper material is injected through the injecting hole in a liquid state, and is hardened while enclosing a predetermined portion of the wire spring that passes through the damper material receptacle.

4. The optical pick-up actuator according to claim 1, wherein the damper material is a liquid viscoelastic material that is hardenable through exposure to ultraviolet rays, and the damper material receptacle is formed of a material that transmits ultraviolet rays.

5. The optical pick-up actuator according to claim 1, further comprising a cover for sealing the injecting hole after the damper material is injected into the damper material receptacle through the injecting hole.

6. The optical pick-up actuator according to claim 1, wherein the damper material receptacle is provided at either side of the wire holder.

7. The optical pick-up actuator according to claim 1, further comprising a fixing protrusion provided on either end of the lens holder, and forming an adhesive chamber opened at a top surface thereof, wherein the one end of the wire spring passes through the adhesive chamber of the fixing protrusion and is coupled to the lens holder by an adhesive.

8. The optical pick-up actuator according to claim 1, further comprising a fixing protrusion provided on either end of the lens holder, and coupled to the one end of the wire spring, wherein the fixing protrusion includes a wire through-hole defined in a side surface thereof for passing the one end of the wire spring therethrough, an opening defined in a top surface of the fixing protrusion for filling with an adhesive, and an adhesive chamber formed therein for holding the adhesive within, the adhesive chamber having sealed surfaces other than the surfaces in which the wire through-hole and the opening are defined.

9. An optical pick-up actuator comprising:
a lens holder including an objective lens, a focusing coil and a tracking coil that are respectively wound with wire, and a fixing protrusion;
magnets installed to respectively face the focusing coil and the tracking coil;
a wire spring coupled at one end thereof to the fixing protrusion, the wire spring for connecting the focusing coil and the tracking coil;
a wire holder including a damper material receptacle through which the other end of the wire spring passes, an insert hole for inserting the other end of the wire spring into the damper material receptacle, and a through-hole for allowing the other end of the wire spring to pass through the damper material receptacle, the damper material receptacle for holding a predetermined damper material for enclosing a predetermined portion of the wire spring that is passed therethrough; and
a circuit board formed on a rear surface of the wire holder, for connecting to the other end of the wire spring that passes through the damper material receptacle,
wherein an injecting hole for injecting damper material is defined in a top surface of the damper material receptacle, the injecting hole being separate from the insert hole and the through-hole.

10. The optical pick-up actuator according to claim 9, wherein the fixing protrusion comprises an adhesive chamber open at a top thereof and hollow inside, for passing the one end of the wire spring therethrough, wherein an adhesive is filled in the adhesive chamber to enclose the one end of the wire spring and become hardened, for coupling the one end of the wire spring to the lens holder.

11. The optical pick-up actuator according to claim 9, wherein the fixing protrusion comprises a wire through-hole defined in a side thereof for the one end of the wire spring to pass therethrough, an opening defined on a top surface thereof for filling the adhesive, and an adhesive chamber with sealed surfaces except for the surfaces in which the wire through-hole and the opening are defined, the adhesive chamber for holding the adhesive therein.

12. The optical pick-up actuator according to claim 9, wherein the fixing protrusion comprises a wire through-hole, and the one end of the wire spring passes through the wire through-hole and is electrically connected and coupled to the substrate installed on the lens holder.

13. The optical pick-up actuator according to claim 9, wherein the damper material is a liquid viscoelastic material that is able to be hardened through exposure to ultraviolet rays, and the wire holder is formed of a material that transmits ultraviolet rays.

14. An optical pick-up actuator comprising:
a base;
a wire holder provided at a side of the base;
a lens holder installed at an upper portion of the base, including an objective lens, and having a fixing protrusion forming an adhesive injecting hole provided on either end thereof;
a magnetic circuit for allowing the lens holder to move;
a wire spring with one end thereof passing through the adhesive chamber of the fixing protrusion and coupled to the lens holder with an adhesive, and the other end thereof fixed to the wire holder; and
a damper material receptacle through which the other end of the wire spring passes, for holding a predetermined damper material that absorbs vibrations generated by the movement of the lens holder,
wherein the fixing protrusion includes a wire through-hole, through which one end of the wire spring passes, which extends through the fixing protrusion, and the adhesive injecting hole is separated from the wire through-hole.

15. The optical pick-up actuator according to claim 14, wherein the damper material receptacle defines an injecting hole at a top thereof, for the damper material to be injected therethrough.

16. The optical pick-up actuator according to claim 14, wherein the adhesive chamber is opened towards a top surface of the fixing protrusion.

17. The optical pick-up actuator according to claim 14, wherein the adhesive chamber is formed as a cavity in a top surface of the fixing protrusion, and the one end of the wire spring is coupled to the lens holder through the adhesive that is filled in the adhesive chamber and hardened.

18. The optical pick-up actuator according to claim 14, wherein the fixing protrusion comprises a wire through-hole defined in a side thereof through which the wire spring passes, and the adhesive chamber is sealed on all surfaces thereof except for the surfaces in which the wire through-hole and the opening are defined.

19. The optical pick-up actuator according to claim 14, wherein the damper material receptacle is formed integrally with the wire holder.

20. The optical pick-up actuator according to claim 14, wherein the damper material receptacle is formed separately from the wire holder and then fastened to either side of the wire holder.

21. The optical pick-up actuator according to claim 14, further comprising a cover for sealing the injecting hole after the damper material is injected through the injecting hole into the damper material receptacle.

22. An optical pick-up actuator comprising:
a base;
a wire holder provided at a side of the base;
a wire spring fixed to a side of the wire holder;
a lens holder installed on an upper portion of the base, and including an objective lens, an adhesive chamber opened at a top surface thereof, and a fixing protrusion provided at either end of the lens holder, the fixing protrusion defining a through-hole for the other end of the wire spring to pass through; and
a magnetic circuit for allowing the lens holder to move,
wherein the fixing protrusion has all surfaces thereof sealed except for the surfaces in which the adhesive chamber and the through-hole are defined.

23. A method of attaching a wire in an optical pick-up actuator, the actuator including a support member, the method comprising:
inserting the wire through at least one hole in the support member; and
applying viscoelastic damper material to the wire through an opening in the support member other than a hole through which the wire passes, to elastically secure the wire to the support member.

24. The method according to claim 23, further comprising providing the at least one hole and the opening in a damper material receptacle, the damper material receptacle holding a predetermined amount of the damper material to absorb vibrations imparted on the wire spring.

25. The method according to claim 23, wherein the opening is generally orthogonal to the at least one hole.

26. The method according to claim 23, wherein the support member is a lens holder.

27. The method according to claim 23, wherein the support member is a base member which supports a lens holder.

* * * * *